April 26, 1960     J. C. MASSAR ET AL     2,934,628
HERMETICALLY SEALED TEMPERATURE SENSITIVE NON-RESETTABLE RELAY
Filed Aug. 25, 1958     2 Sheets-Sheet 1
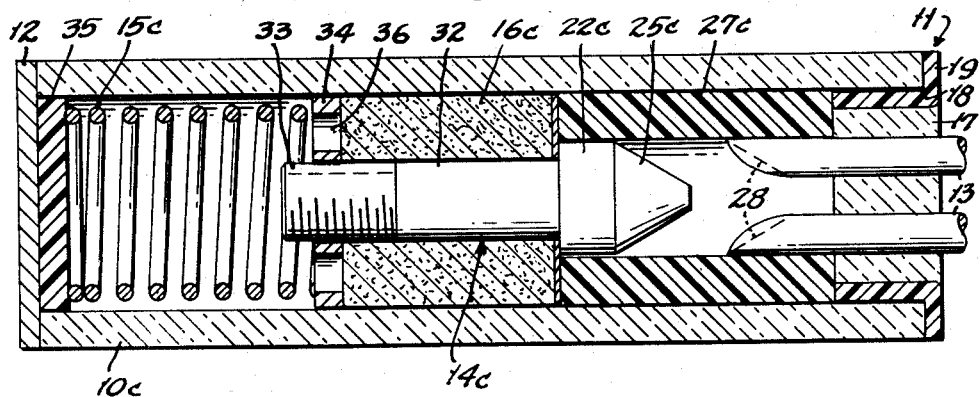
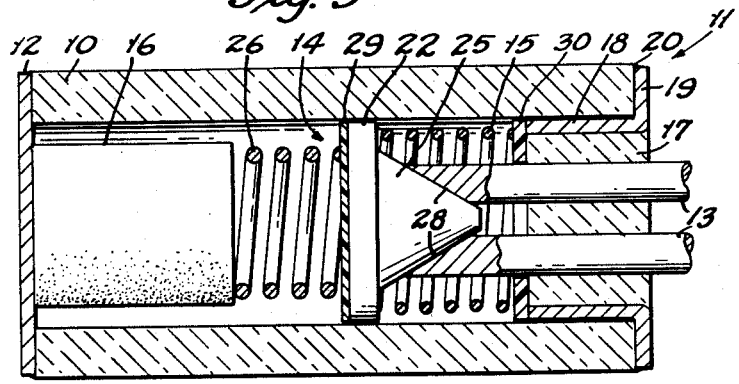
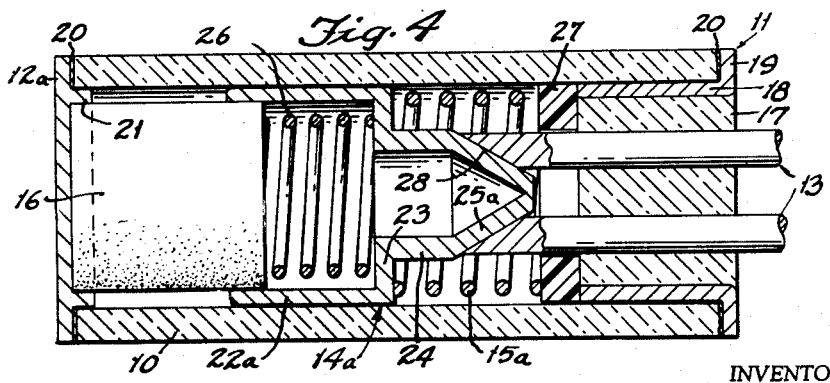
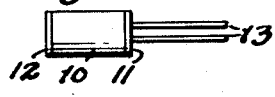
INVENTORS
JULIUS C. MASSAR
MIGUEL A. CATANESCO
BY Sellers & Latta
—ATTORNEYS—

INVENTOR.
JULIUS C. MASSAR
MIGUEL A. CATANESCO
BY
Sellers & Latta
—ATTORNEYS—

United States Patent Office 2,934,628
Patented Apr. 26, 1960

2,934,628

HERMETICALLY SEALED TEMPERATURE SENSITIVE NON-RESETTABLE RELAY

Julius C. Massar and Miguel A. Catanesco, Van Nuys, Calif., assignors to Networks Electronic Corporation, Los Angeles, Calif., a corporation of California Application August 25, 1958, Serial No. 756,758

18 Claims. (Cl. 200—142)

This invention relates to electric circuit breakers and makers and has as its general object to provide an improved temperature sensitive relay which can be either normally open or normally closed and which, when actuated once in response to an abnormal temperature increase above its rated limit, cannot be reset for further use. There is a very substantial demand for such a relay, particularly for use in the control systems of guided missiles, ballistic missiles of the rocket type, etc., and the primary requirement in such cases is dependability of operation, including resistance to shock and vibration, sharpness of response to an abnormal temperature, and, in particular, reliability and operation within a fairly narrow tolerance range of temperatures on either side of a temperature selected as the rated maximum limit for the particular use to which the relay is to be adapted.

One of the objects of the invention is to provide a relay which may be hermetically sealed. Another object is to provide such a relay having improved shock and vibration resistance. A further object is to provide such a relay which will operate reliably within a fairly narrow tolerance range of temperatures, which may be as small as one fourth or one fifth of the tolerated spread of temperatures at which the more common type of circuit breakers (fuses etc.) utilizing tension type fusable links, may operate.

A further object is to provide such a relay which, by variations in the temperature sensitive element thereof, may be adapted for use over a greatly increased range of temperature limit ratings than is possible with prior temperature sensitive relays.

A further object is to combine the foregoing characteristics in a relay of relatively simple and inexpensive construction.

Other objects and advantages will become apparent in the ensuing specification and appended drawing in which:

Fig. 1 is a side view of a relay embodying the invention;

Fig. 2 is an end view thereof;

Fig. 3 is an axial sectional view thereof on an enlarged scale;

Fig. 4 is an axial sectional view of a modified form of the invention, on an enlarged scale;

Fig. 5 is an axial sectional view of another modified form of the invention, on an enlarged scale;

*General features of invention*

Figure 7:
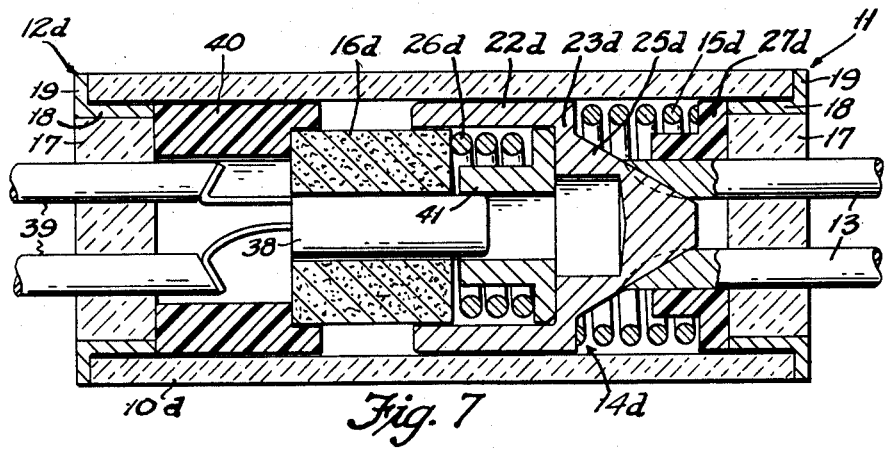
Fig. 7 is an axial sectional view of another modified form of the invention, on an enlarged scale.

Referring now to Fig. 3 of the drawing, by way of example, I have shown therein one of the more simple forms in which the invention may be embodied, yet which contains all of the basic elements of the invention, including a housing 10; a header 11 closing and sealing one end of the housing 10; a metal cap 12 closing and sealing the other end of the housing; a pair of contact terminals 13 extending through, sealed in and insulated from one another by the header 11; a plunger contact 14 which is mounted in the housing 10 for axially sliding movement between a normal position which in this instance is the closed position shown, wherein it is in engagement with and electrically connects the contact terminals 13, and an alternate position which in this instance is an open position, moved away from the terminals 13; a loading spring 15 which yieldingly loads the contact 14 for movement away from its normal position to its alternative position; and a temperature sensitive element 16 which holds the contact 14 in its normal position, overcoming the loading spring 15 (together with the stronger short travel compression spring 26 in the case of the N.C. relay only) until such time as a rise in temperature above the rated limit of the relay causes the temperature sensitive element 16 to give way and to allow the loading spring 15 to act.

The invention utilizes, for the temperature sensitive element 16, a fusible pellet which is interposed in compression between a fixed abutment and the loading spring 26, maintaining spring 15 in a compressed condition. The pellet 16 is composed of fine grains of a rigid, heat resistant material, such as powdered ceramic material which does not melt or soften at any temperature within the range of operation of the relay, intimately mixed with a fusible binder which, within the range of temperatures below the rated limit of the relay, binds the infusible grains together in a rigid, unyielding body of more than ample compressive strength to withstand, without any deformation, over long periods of time, the compressive load applied thereto by the loading spring 15, so as to maintain the contact 14 securely in its normal position whether closed or open. It retains this deformation resisting rigidity up to the temperature at which it breaks down. At that temperature, it disintegrates abruptly, without any appreciable intermediate softening stage, and as a result, the relay operates sharply to shift the contact 14 to its alternative position with a minimum of arcing. This operating characteristic is derived from the fact that the binder is a eutectic material, liquifying abruptly without intermediate softening, and when liquified, it acts as a lubricant between the solid infusible grains of the pellet so that the entire mass of pellet material becomes in effect a highly fluid mass which has no residual resistance to the spring loaded movement of the contact 14.

For various temperature ratings, varying binding materials can be used. In the lower ranges of temperature, the binder materials may be various waxes including the hydrocarbon waxes, the natural waxes such as carnauba and beeswax, and the special composition waxes such as dental waxes and other waxes used in the "lost wax" casting processes. For higher temperature ranges, eutectic metal alloys of various melting points may be utilized.

The pellet material has a very high dielectric coefficient so as to be practically non-conducting for any of the uses to which the relays of this invention may be adapted.

*Detailed description—Relay of Fig. 4*

Referring now to Fig. 4, the housing 10 shown therein by way of example is a cylindrical tube of high temperature resistance glass of the Pyrex family (high lead content or borosilicate glass). The header 11 is of composite construction including a core 17 of similar glass having diametrically spaced bores through which the contact terminals 13 extend, and including a metal part comprising a cylindrical collar 18 soldered or fused to the periphery of core 17 and a radial flange 19 soldered to the end of housing 10. Contact terminals 13 are fused into the bores of core 17 and thereby hermetically sealed in the header 11. The core 17 is initially fabricated of sintered powdered glass, the contacts 13 are inserted through the molded bores therein and the assembly of terminals and core is then fused in an oven to provide a non-porous core body sealed to the terminals. Optionally, the collar 18 may be added to the assembly prior to the fusing operation and the entire assembly of the complete header and terminals fused in the same baking operation.

The soldered joint 20 between the header and the housing 10 preferably comprises a thin film of noble metal such as silver deposited (as by washing) on the end surface of the housing 10, an electrodeposited coating of copper covering the silver film, an electrodeposited noble metal (e.g. silver) surface on the underside and periphery of flange 19, and a binding layer of solder interposed between this noble metal surface and the copper coating on the glass. Similarly, the end cap 12a is soldered to the other end of the housing 10. The metal in the cap 12a and the metal part of header 11 is preferably a corrosion resistant metal, such as Kovar (an alloy of iron, nickel and cobalt) having substantially the same coefficient of thermal expansion as to the housing 10 and core 17. The cap and header are hermetically sealed to the housing 10 by baking the assembly.

More detailed information upon this soldered joint construction is contained within the application of Mihai D. Patrichi Serial No. 739,932, filed June 4, 1958, for Electrical Component with Improved Metal to Glass End Sealing Mechanism.

The cap 12a in this form of the invention is provided with an integral cylindrical flange 21 in which one end of the fusible pellet 16 is piloted. The plunger contact 14a is hollow, embodying a rim in the form of a cylindrical skirt 22a in which the other end of the pellet 16 is piloted, a radial offset shoulder portion 23, a reduced tubular (e.g. cylindrical) neck 24, and a conical contact head 25a. A holding spring 26 (of greater compression resistance than loading spring 15a) is interposed under compression between the pellet 16 and the inner face of radial shoulder 23. Spring 26 is retained in substantially coaxial relation to the other parts by the encircling skirt 22a. Loading spring 15a is engaged under compression between the outer face of radial shoulder portion 23 and a circular spacer collar 27 which bears against the inner end of header 11. Terminals 13 have contact end portions which project inwardly beyond header 11, through the spacer collar 27, and into the space encircled by loading spring 15a where they are provided with beveled end faces 28, flaring toward the contact 14a with the same angle as the angle of taper of conical contact head 25a. Contact surfaces 28 are of conic section configuration, to fit snugly the surface of contact head 25a.

The cylindrical external surface of skirt 22a is in smooth sliding bearing engagement with the internal wall of housing 10 to guide the contact 14a for sliding movement between the normally closed position shown in Fig. 4 and a retracted, open position to which it will be moved by loading spring 15a upon melting of the fusible pellet 16.

The holding spring 26 constitutes a yielding link between the pellet 16 and contact 14a such as to insure snug contact of the head 25a against the terminal end faces 28. The loading spring 15a being more yieldable than the holding spring 26 is dominated by the latter and thus is maintained sufficiently compressed to allow the full contact of head 25a against the contact faces 28.

*The invention as disclosed in Fig. 3*

Referring again to Fig. 3, which discloses a simplified form of the invention suitable for ordinary commercial, non-military applications, the contact 14 may be either hollow or solid, including a cylindrical rim 22 and a conical contact head 25. The rim 22 centers the contact for sliding movement in housing 10, and the head 25 engages conical contact faces 28 of terminals 13 the same as in the previously described form. A thin insulator disc 29 is interposed between the flat rear side of contact 14 and the holding spring 26. Cap 12 is a plain flat metal disc. Pellet 16 and spring 26 are approximately centered by being confined within the housing 10, without the assistance of parts such as the skirt 22a and flange 21 of Fig. 4. An insulator washer 30 is interposed between the end of spring 15 and the inner end of header 17.

The invention contemplates the possibility of utilizing a more inexpensive housing for the simpler relay shown in Fig. 3 or for other simpler versions of the invention. Molded plastic housings of high impact synthetic resins plastic material may be used for some applications, especially in the low temperature range. In the high temperature range, the invention contemplates the use of molded ceramic housing.

*Normally open relay—Fig. 5*

Fig. 5 illustrates the invention as applied to a normally open type of relay. In this relay, the housing 10c may be of the same construction as housing 10 of Fig. 3 except that it is generally longer. The assembly of header 11 and contact terminals 13, and the cap 12 may be of the same construction as in Fig. 3. An insulator spacer sleeve 27c, bearing against the inner end of header 11 and surrounding the projecting contact ends of terminals 13 the same as in Fig. 4, is extended to provide an abutment against which one end of the fusible pellet 16c is supported, with a washer interposed as shown. The pellet 16c in this instance is of cylindrical sleeve form, and the contact 14c includes a stem 32 extending through the pellet 16c and having a threaded end 33 onto which is threaded an abutment flange 34.

At its other end, contact 14c has a conical contact head 25c which engages flaring conical end faces 28 of terminals 13 the same as in Fig. 3, and a cylindrical rim portion 22c integrally joining the head 25c to stem 32 and of larger diameter than the stem so as to define a shoulder which is normally engaged against the washer shown bearing against the end of pellet 16c. Flange 34 through its threaded connection to stem 32 may be adjusted to snugly engage the pellet 16c between the washer and the flange. A loading spring 15c is engaged under compression between the under side of flange 34 and an insulating disc 35 which is seated against the cap 12. Rim 22c has a smooth sliding fit within the spacer sleeve 27c.

Through the flange 34, pellet 16c normally holds the plunger contact 14c in its retracted, open position, withstanding the loading of spring 15c. When the pellet 16c melts in response to a temperature increase above its rated limit, the spring load, applied to contact 14c through flange 34, will impel the contact to its closed position, the melted pellet material draining through a series of circumferentially spaced apertures 36 in flange 34, into the space occupied by spring 15c. As the contact 14c moves forwardly, it will be guided by the engagement of stem 32 within the washer abutting the shoulder of rim 22c and the engagement of rim 22c within spacer sleeve 27c and of flange 34 within housing 10c.

Figure 6:
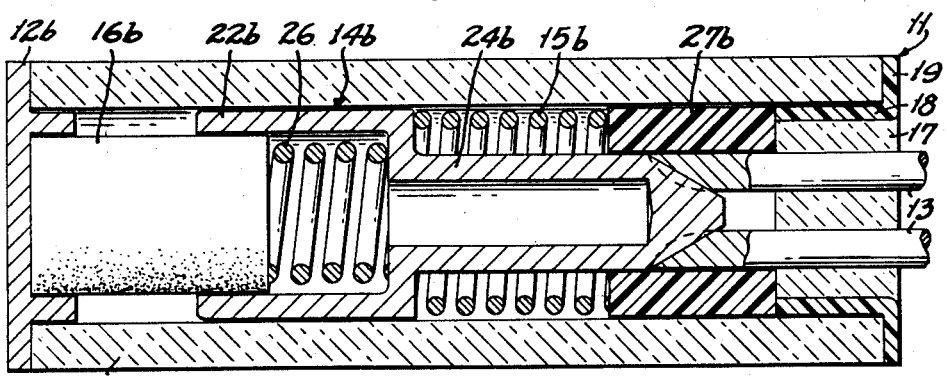
Fig. 6 is an axial sectional view of another modified form of the invention, on an enlarged scale.

*Modified form—Fig. 6*

The relay disclosed in Fig. 6 is the same as that disclosed in Fig. 4, with the exception that it is longer in proportion to its diameter, the neck portion 24b of the contact 14b and the spacer collar 27b being considerably longer to avoid any contact between terminals 13 and the spring 15b. In other respects, the relay of Fig. 6 is the same as Fig. 4 as indicated by the use of the same numerals to designate the various parts thereof.

Time delay relay—Normally closed—Fig. 7

Referring now to Fig. 7, the relay shown therein is a time delay relay, the actuation of which is triggered by the heating up of a heating element 38 which is energized by a heating circuit including a pair of heater terminals 39 extending through and sealed in a cap 12d which is an insulator header of the same construction as header 11. The heating element 38 is of rod form (e.g. cylindrical) and extends through a tubular fusible pellet 16d. Pellet 16d has it rear end piloted in a counterbore in one end of a spacer sleeve 40 the other end of which is engaged against the inner end of header 12d. The forward end of pellet 16d bears against a holding spring 26d which is contained within the skirt portion 22d of a plunger contact 14d. A flanged guiding grommet 41 is interposed between the holding spring 26d and the inner side of a radial shoulder 23d joining the skirt 22d to a conical contact head 25d. The grommet guides the end of the heating element 38 after the pellet melts. A flanged insulator collar 27d is interposed between one end of loading spring 15d and header 11, the other end of loading spring 15d bearing against the shoulder 23d.

The arrangement of pellet 16d, holding spring 26d, plunger contact 14d and loading spring 15d is generally the same as in the normally closed relays of Figs. 6, 3 and 4. The pellet 16d however is selected to respond to the heating effect of heater element 38, and the relay provides a time delay response to the closing of the circuit through heater terminals 39 to the heating element 38, determined by the length of time required for the element 38 to heat up to the rated temperature of pellet 16d.

The primary advantage of the invention is derived from the fact that the fusible pellet can be fabricated with melting temperatures differing by 5 to 6 degree increment, over a range between 114° F. and 1000° F. for relays embodying the metal and glass housing structure shown in the drawing, and on up to 2600° F. for relays utilizing housing structure of higher temperature resistance such as a ceramic housing. The relay can be constructed in either the normally open or the normally closed arrangements described above, the change from one to the other being made generally by reversing, end to end, the location of the pellet and the coil spring with relation to the plunger contact. In each case the pellet is on one side of the plunger, under compression and the coil spring is compressed on the opposite side of the plunger.

Figure 8:
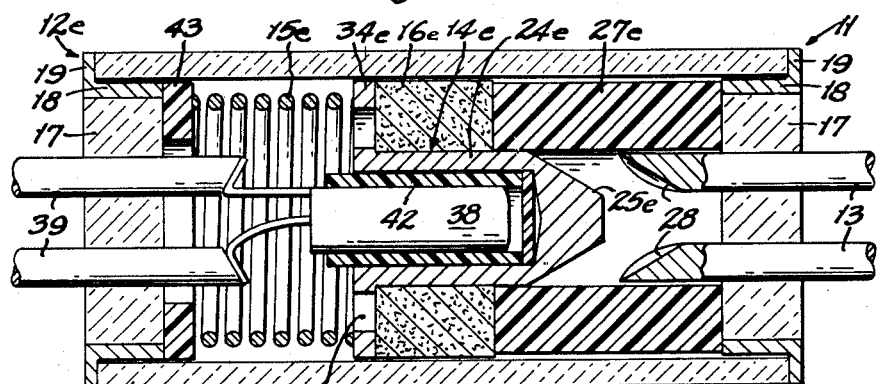
Fig. 8 is an axial sectional view of another modified form of the invention, on an enlarged scale.

Time delay relay—Normally open—Fig. 8

The relay of Fig. 8 is similar in many respects to the relay shown in Fig. 5, the contact 14e including, in addition to its contact head 25e and tubular neck 24e, a perforated flange 34e which bears against a tubular fusible pellet 16e under the pressure of loading spring 15e. Neck 24e extends through pellet 16e and into a spacer collar 27e, encloses the contact head 25e and the contact ends of terminals 13 within the collar, and cooperates with collar 27e to direct the melted remains of pellet 16e through the apertures 36 of flange 34e when the pellet is melted. The heating element 38 is enclosed in the cavity within neck 24e and insulated therefrom by a sleeve 42 of insulating material. The pellet 16e holds the contact 14e in the normally open position shown and permits it to move to the closed position under the loading of spring 15e when the pellet 16e is melted by heat conducted through the neck 24e from heater 38 when the circuit through terminals 39 is closed. The header 12e is of substantially the same construction as header 12d. A washer 43 is interposed between the header 12e and the loading spring 15e.

We claim:

1. In a temperature sensitive relay: a housing comprising a length of high temperature resistant cylindrical glass tubing; a header closing one end of said housing; a pair of terminals extending through said header and insulated therein from one another; a plunger contact slidably mounted in said housing between a closed position in engagement with said terminals to establish a connection between them, and an open position disengaged from said terminals; means resiliently loading said contact for movement to one of said positions; and a fusible pellet of a selected melting point loaded under compression by said loading means and holding said contact in the other of said positions at normal temperatures, said pellet, in response to a rise in temperature above its rated limit, melting and thereby releasing said loading means to impel said contact to its said one position.

2. A relay as defined in claim 1, including a cap closing the other end of the housing and wherein said resilient loading means and said fusible pellet are interposed in series between said cap and said contact, and said contact is normally in an open position.

3. A relay as defined in claim 1, including a cap closing the other end of said housing; wherein said pellet is interposed between said cap and said contact to hold the latter in a normally closed position; and wherein said resilient loading means is interposed under compression between said contact and said header to move said contact to the open position upon melting of such pellet.

4. In a hermetically sealed temperature sensitive relay: a housing comprising a length of high temperature resistant cylindrical glass tubing; an insulator header closing and sealing one end of said housing; a cap closing and sealing the other end of said housing; a pair of terminals extending through said header and insulated therein from one another; a plunger contact slidably mounted in said housing between a closed position in engagement with said terminals to establish a connection between them, and an open position disengaged from said terminals; a coil spring and a fusible pellet arranged in said housing with the pellet holding the spring in compressed condition and retaining the contact plunger in one of its said positions, and with the coil spring loading the contact for movement to its other position; said pellet, in response to temperature increase above its rated limit, melting and thereby releasing the said spring to impel said contact to its said other position.

5. In a hermetically sealed temperature sensitive relay: a housing comprising a length of high temperature resistant glass tubing; an insulator header closing and sealing one end of said housing; a cap closing and sealing the other end of said housing; a pair of terminals extending through said header and insulated therein from one another; a plunger contact slidably mounted in said housing between a closed position in engagement with said terminals to establish a connection between them, and an open position disengaged from said terminals; a coil spring and a fusible pellet arranged in said housing in coaxial alignment with said contact, under compression between said header and cap, with said coil spring loading said contact for movement to one of its said positions, said pellet holding said contact in the other of its said positions in opposition to the loading effect of said coil spring and releasing said contact for said movement upon melting in response to temperature increase above its rated limit.

6. In a hermetically sealed temperature sensitive relay: a housing comprising a length of high temperature resistant cylindrical glass tubing; an insulator header closing one end of said housing; a cap closing the other end of said housing; a pair of terminals extending through said header and insulated therein from one another; a plunger contact slidably mounted within said housing for movement between a closed position engaging and electrically connecting said terminals and an open position disengaged from said terminals; and a coil spring and a fusible pellet arranged in said housing with the pellet holding the spring in compressed condition and retaining the contact plunger in one of its said positions, and with the coil spring loading the contact for movement to its other position; said pellet, in response to temperature increase above its rated limit, melting and thereby releasing the said spring to impel said contact to its said other position.

7. A relay as defined in claim 6, wherein said header comprises a cylindrical metal collar received in said one end of the housing and having an integral radial flange soldered to the end of the housing, and a core of high temperature glass bonded into said collar and having a pair of bores in which said terminals are sealed.

8. In a hermetically sealed temperature sensitive relay: a housing comprising a length of high temperature cylindrical glass tubing; an insulator header closing one end of said housing; a cap closing the other end of said housing; a pair of terminals extending through said header and insulated therein from one another; a plunger contact having a rim slidably fitted within said housing and a contact head normally engaging and electrically connecting said terminals; a coil spring engaged under compression between said header and said contact rim in encircling relation to said head and loading said contact for movement to an open position; and a fusible pellet and a yielding link of greater compression resistance than said loading spring, interposed in series between said contact and cap and maintaining said contact in a closed position in engagement with said terminals in opposition to the action of said loading spring; said pellet melting in response to temperature increase above its rated limit, whereby to release said contact for movement to its open position under the impelling action of said loading spring.

9. A relay as defined in claim 8, wherein said yieldable link consists in a second coil spring disposed between one end of said pellet and said contact, the other end of said pellet being seated against said cap.

10. A relay as defined in claim 9, wherein said contact rim includes a hollow cylindrical skirt portion receiving said second coil spring, wherein said head is of reduced diameter and extends into said loading spring, and including an offset shoulder joining said skirt portion to said reduced head, said loading spring being engaged under compression between said offset shoulder and the inner end of said header.

11. A relay as defined in claim 10, including a spacer collar of insulating material interposed between the inner end of said header and said loading spring, wherein said terminals have end portions projecting from said header into said collar, wherein said contact includes a reduced cylindrical neck joining said shoulder to said head, wherein said projecting terminal ends have beveled end faces flaring toward said contact head and the latter is conical, with an angle of taper corresponding to the angle of flare of said beveled end faces and engageable therebetween with a wedging fit, and wherein said cap has a cylindrical flange in which one end of said pellet is piloted, the other end of said pellet being piloted within said contact skirt.

12. In a hermetically sealed temperature sensitive relay: a housing comprising a length of high temperature resistant glass tubing; an insulator header closing and sealing one end of said housing; a cap closing and sealing the other end of said housing; a pair of terminals extending through said header and insulated therein from one another; a plunger contact slidably mounted in said housing between a closed position in engagement with said terminals to establish a connection between them, and an open position disengaged from said terminals; a coil spring and a fusible pellet arranged in series under compression between said cap and contact, with said pellet holding said contact in said open position in opposition to the loading effect of said spring; said pellet, in response to temperature increase above its rated limit, melting so as to release said spring to impel said contact to said closed position.

13. In a hermetically sealed temperature sensitive relay: a housing comprising a length of high temperature resistant glass tubing; an insulator header closing and sealing one end of said housing; a cap closing and sealing the other end of said housing; a pair of terminals extending through said header and insulated therein from one another; an insulator sleeve disposed in said housing with one end abutting said header; said terminals having spaced contact ends projecting into said one end of said sleeve; a plunger contact including a head in opposed, normally disengaged relation to said contact ends and a stem projecting from said head toward said cap; a tubular fusible pellet through which said stem projects, said pellet having one end in abutting relation to said insulator sleeve; a flange secured to said stem and seated against the other end of said pellet; and a coil spring engaged under compression between said flange and said end cap and loading said contact for movement to its closed position upon melting of said pellet in response to an increase in temperature above its rated limit.

14. A relay as defined in claim 13, wherein said flange is apertured for drainage of the melted residue of said pellet into the space occupied by said coil spring.

15. A relay as defined in claim 5, wherein said terminals have end portions projecting into said housing beyond the inner end of said header in diametrically spaced relation and with beveled ends flaring away from said header, and wherein said contact has a concentric conical head tapered to match the flare of said terminal end and engageable therebetween with a wedging contact.

16. In a hermetically sealed temperature sensitive delay relay: a tubular housing; an insulator header closing and sealing one end of said housing; an insulator cap closing and sealing the other end of said housing; a pair of contact terminals extending through said header and insulated therein from one another; a pair of heater terminals extending through said cap and insulated therein from one another; a plunger contact slidably mounted in said housing between a closed position in engagement with said contact terminals to establish a connection between them, and an open position disengaged from said terminals; means resiliently loading said contact for movement to one of said positions; a fusible pellet loaded under compression by said loading means and holding said contact in the other of said positions at normal temperatures; and an electric heating element connected to said heater terminals and intimately associated with said pellet for melting the same and effecting the movement of said contact to its said one position when said heater element is energized.

17. A relay as defined in claim 16, wherein said loading means consists in a coil spring engaged under compression between the inner end of said header and said contact; wherein said pellet is of annular form and in encircling relation to said heating element; and including a second coil spring of greater resistance than said loading spring, interposed between one end of said pellet and said contact, the other end of said pellet being supported by said end cap.

18. A relay as defined in claim 17, including a spacer collar interposed between said end cap and said other end of the pellet, said heater terminals extending beyond said end cap into said spacer collar, said heater being of rod form and having an end part projecting beyond said pellet, said contact including a skirt portion within which said second coil spring is contained, having a reduced contact head normally engaging said contact terminals and a radial shoulder portion joining said skirt portion and contact head; said loading spring being engaged under compression between said shoulder portion and header; said relay further including a guide grommet interposed between said second coil spring and said radial shoulder portion and having a tubular part extending into said second coil spring and receiving said projecting end of the heating element.

References Cited in the file of this patent

UNITED STATES PATENTS

| | | |
|---|---|---|
| 2,203,414 | Knaack | June 4, 1940 |
| 2,415,720 | Angel et al. | Feb. 11, 1947 |
| 2,442,830 | Spracher | June 8, 1948 |
| 2,516,964 | Derby et al. | Aug. 1, 1950 |
| 2,587,506 | Moreland | Feb. 26, 1952 |
| 2,683,201 | Miller | July 6, 1954 |
| 2,704,797 | Fettweis | Mar. 22, 1955 |